(12) United States Patent
Cole et al.

(10) Patent No.: US 9,172,780 B1
(45) Date of Patent: Oct. 27, 2015

(54) EXTENDED FUNCTION AUDIO CONNECTORS

(71) Applicant: Sprint Communications Company L.P., Overland Park, KS (US)

(72) Inventors: Joshua Cole, Overland Park, KS (US); Trevor Shipley, Olathe, KS (US); Craig Allen Sparks, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 206 days.

(21) Appl. No.: 13/860,341

(22) Filed: Apr. 10, 2013

(51) Int. Cl.
*H04M 1/00* (2006.01)
*H04M 1/02* (2006.01)

(52) U.S. Cl.
CPC .................................. *H04M 1/0274* (2013.01)

(58) Field of Classification Search
CPC ..... H04W 76/005; H04W 88/02; H04M 1/31; H04M 1/6058; H04M 1/72519; H04M 1/72522; H04M 1/72527
USPC ......... 455/550.1, 556.1, 557, 575.2, 518, 519
See application file for complete search history.

(56) References Cited

U.S. PATENT DOCUMENTS

| | | | | |
|---|---|---|---|---|
| 7,780,478 | B2 * | 8/2010 | Tang et al. | 439/668 |
| 2003/0008564 | A1 * | 1/2003 | Lebron | 439/638 |
| 2013/0078869 | A1 * | 3/2013 | Golko et al. | 439/668 |
| 2013/0122852 | A1 * | 5/2013 | Crestol | 455/404.2 |
| 2013/0259255 | A1 * | 10/2013 | Schul et al. | 381/74 |
| 2013/0272559 | A1 * | 10/2013 | Larson et al. | 381/375 |
| 2014/0155708 | A1 * | 6/2014 | Petersen et al. | 600/301 |
| 2014/0363015 | A1 * | 12/2014 | Braho | 381/74 |

* cited by examiner

*Primary Examiner* — Temica M Beamer

(57) ABSTRACT

A telecommunications device capable of performing a plurality of functions in addition to telecommunications functions is disclosed. The telecommunications device comprises a memory, a processor, and instructions stored in the memory and executable by the processor. The instructions are configured such that the device performs a function specified by the instructions to be performed when a pulsed analog electrical signal is received via a contact point on an integrated plug that is inserted into a socket on the device and that has three electrically independent microphone contacts, wherein the signal is generated responsive to an action taken on a hardware component on the device, and wherein the specification of the function to be performed occurs after the manufacturing process for the device is complete.

20 Claims, 7 Drawing Sheets

Parallel

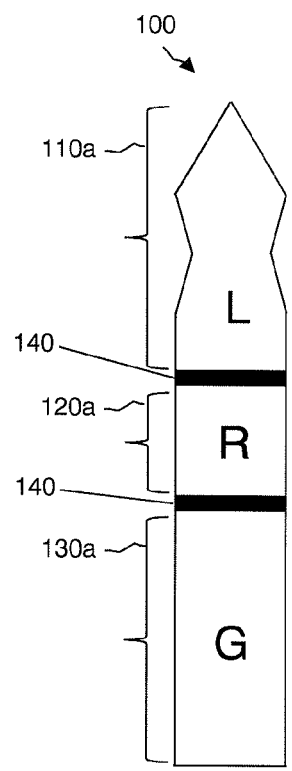
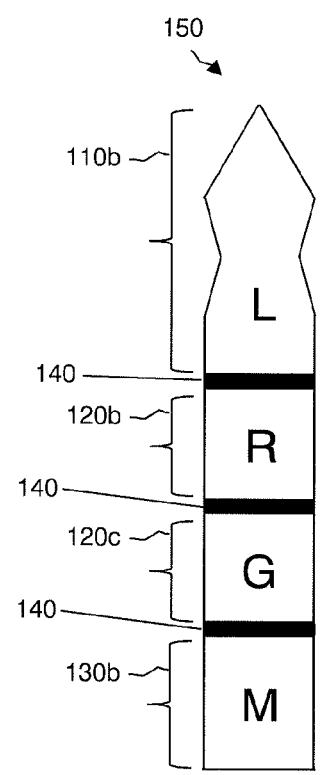
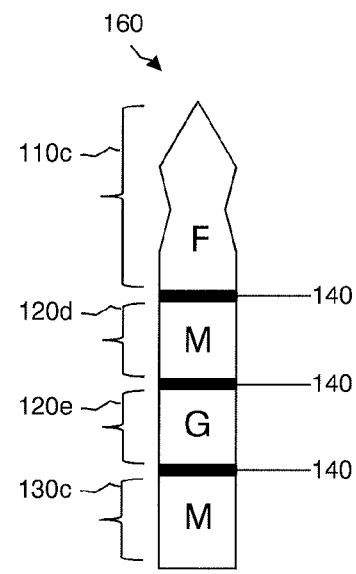
Figure 1a
(prior art)
Figure 1b
(prior art)
Figure 1c
(prior art)

Cross　　　　　　Parallel　　　　　　Linear

EXTENDED FUNCTION AUDIO CONNECTORS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones, personal digital assistants, and similar portable electronic devices that have telecommunications capabilities may be equipped with a push-to-talk feature that allows a user of the device to simultaneously speak to one or more users of similarly equipped devices by pushing a single button on the device. That is, when a first user in a push-to-talk group presses a push-to-talk button on a device and speaks into the device, the voice of the first user may be heard on the devices of the other users in the group. The other users cannot transmit from their devices in a push-to-talk manner as long as the first user keeps the push-to-talk button on the first user's device depressed. When the first user releases the push-to-talk button, a second user in the group may then press the push-to-talk button on the second user's device and communicate with the other members of the group in a similar manner. In this way, communication can occur between the members of a group without the need for setting up a conference call among the members. Such half-duplex communication can also prevent the members of the group from attempting to speak simultaneously and can prevent background noise that may be occurring in the vicinity of one of the group members from being overheard by the other members, as may be the case in a conference call.

Some devices may also be equipped with an active noise cancelation feature and/or an active noise reduction feature. As used herein, active noise cancelation may refer to the attenuation of background noise in sounds received by a device, and active noise reduction may refer to the attenuation of background noise in sounds transmitted by a device. In some cases, active noise cancelation and/or active noise reduction may be achieved through the use of a plurality of microphones on a headset that is coupled to a telecommunications device. At least one of the microphones may be configured such that the voice of the user of the device is the primary component of the sound received by the microphone. The other microphones on the headset may be configured such that background noise in the user's vicinity is the primary component of the sound received by the microphones. An electrical signal generated by the background noise-focused microphones may be analyzed and an electrical signal that is the inverse of the background noise signal may then be generated. For active noise cancelation, the inverse signal may be added to the background noise signal and an incoming sound-based signal, such as the other party in a telephone call or a music recording. In this way, the device user may experience an attenuation of ambient background noise and may hear the incoming sounds more clearly. For active noise reduction, the inverse signal may be added to the background noise signal and the signal generated by the voice-focused microphone when the device user is on a telephone call. In this way, the other party in the telephone call may experience an attenuation of the background noise in the device user's vicinity and may hear the device user's voice more clearly.

Any component with a capability for telecommunication may be referred to herein as a handset, a device, a telecommunications device, or a mobile device, but it should be understood that such a component is not necessarily transportable. Also, it should be understood that the devices described herein do not necessarily have push-to-talk capabilities, active noise cancelation capabilities, or active noise reduction capabilities.

SUMMARY

In an embodiment, a telecommunications device capable of performing a plurality of functions in addition to telecommunications functions is disclosed. The telecommunications device comprises a memory, a processor, and instructions stored in the memory and executable by the processor. The instructions are configured such that the device performs a function specified by the instructions to be performed when a pulsed analog electrical signal is received via a contact point on an integrated plug that is inserted into a socket on the device and that has three electrically independent microphone contacts, wherein the signal is generated responsive to an action taken on a hardware component on the device, and wherein the specification of the function to be performed occurs after the manufacturing process for the device is complete.

In another embodiment, a method for initiating a function on a telecommunications device is disclosed. The method comprises receiving an electrical signal via a contact point on a plug inserted into a socket on the device and performing a function specified to be performed when the electrical signal is received via the contact point, wherein the specification of the function to be performed occurs after the manufacturing process for the device is complete.

In another embodiment, a telecommunications device capable of performing a plurality of functions in addition to telecommunications functions is disclosed. The telecommunications device comprises a memory, a processor, and instructions stored in the memory and executable by the processor. The instructions are configured such that, when the device receives identity information for a component via a contact point on a plug inserted into a socket on the device, the device makes available for initiation a subset of all functions provided by the device, the subset being determined based on the identity information.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 1a, 1b, and 1c illustrate various plugs according to the prior art.

DETAILED DESCRIPTION

Figures 2A, 2B, 2C:
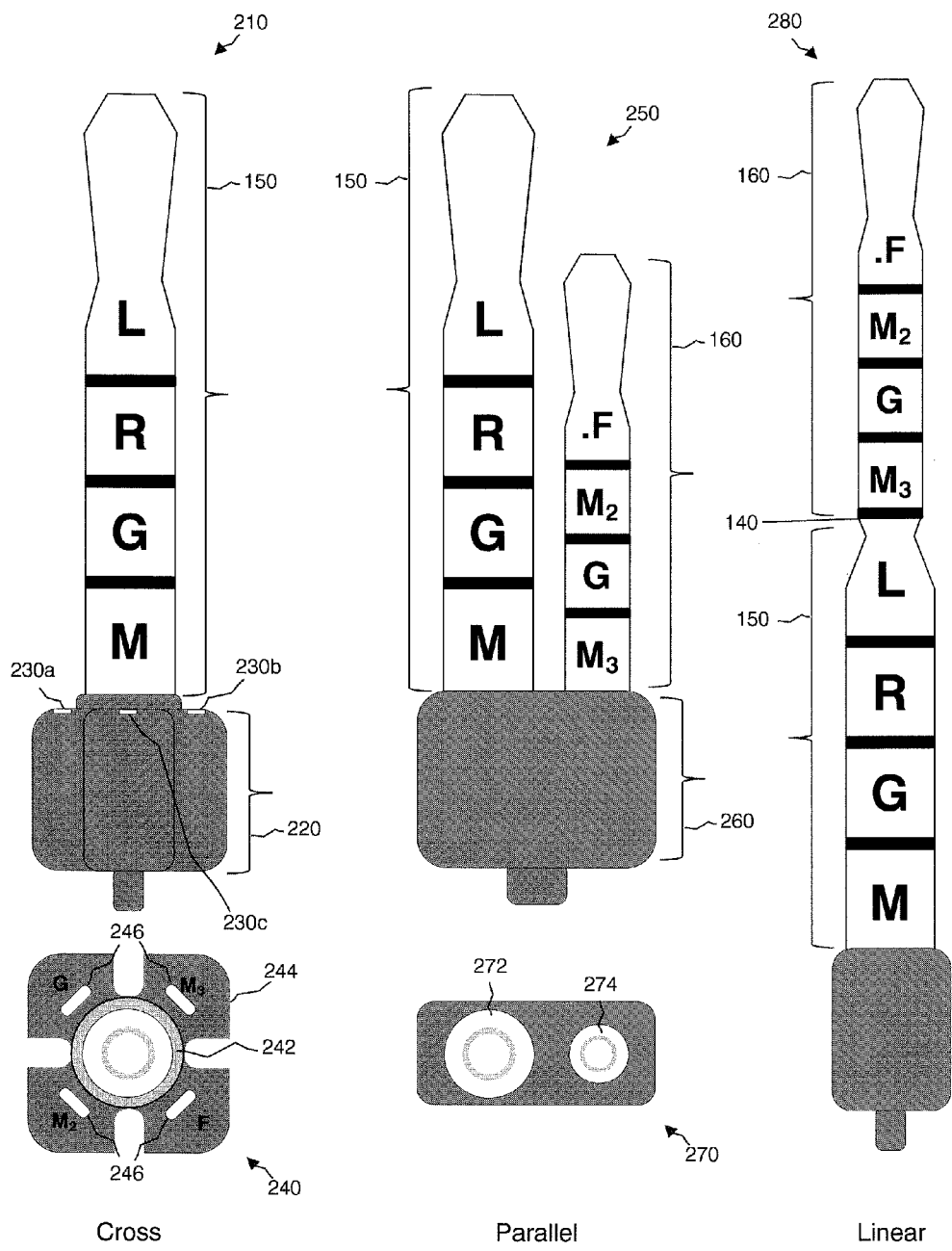
FIGS. 2a, 2b, and 2c illustrate examples of plugs suitable for implementing the several embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the present disclosure provide, on a plug that can couple a headset to a mobile device, at least one contact point capable of promoting the initiation of a function on the mobile device. In some embodiments, the function is initiated via the contact point when a function button on the headset is depressed. The function initiated via the contact point may be specified by a user of the mobile device. The function button may additionally or alternatively have the capability to initiate a push-to-talk transmission. In some embodiments, the contact point may additionally or alternatively have the capability to be used in an active noise cancelation and/or active noise reduction feature or may have the capability to be used for some other function provided by the mobile device. The contact point may be one of a plurality of microphone contacts or may be a function contact. In some embodiments, identity information associated with the headset may be provided to the mobile device via the contact point.

When such features are provided to a mobile device, a user of the device can use the function button to initiate numerous functions in addition to or instead of a push-to-talk function. For example, the user may specify that the function button is to be associated with a photography function, and pressing the function button may cause the mobile device to take a still photograph or capture a video recording. As another example, the user may specify that the function button is to be associated with an audio recording function, and pressing the function button may cause the mobile device to make an audio recording. As yet another example, the user may specify that pressing the function will cause a telecommunications component on the mobile device to automatically dial a predefined telephone number. For instance, the function button may act as a panic button by automatically dialing 911 or some other emergency number when pressed. In such a case, the mobile device may also begin recording ambient sounds when the function button is pressed.

FIGS. 1a, 1b, and 1c illustrate plugs known in the prior art. FIG. 1a illustrates a so-called TRS plug 100 that may be used for playback of a stereo audio signal. A tip portion 110a may carry a left channel of the audio signal, a ring portion 120a may carry a right channel of the audio signal, and a sleeve portion 130a may be a ground. The tip 110a, ring 120a, and sleeve 130a may be separated by insulating material 140. Any tip 110, ring 120, or sleeve 130 portion of a plug may be referred to generically herein as a contact point.

FIG. 1b illustrates a TRRS plug 150 that may be used for playback of a stereo audio signal and for transmission of signals generated via a microphone. A tip portion 110b may carry a left channel of the audio signal, a first ring portion 120b may carry a right channel of the audio signal, a second ring portion 120c may be a ground, and a sleeve portion 130b may carry the microphone output. The plugs 100 and 150 in FIGS. 1a and 1b may have a diameter of about 3.5 millimeters (mm).

FIG. 1c illustrates another TRRS plug 160 that may be used to provide additional functions. A tip portion 110c may be used to activate a function on a mobile device, a first ring portion 120d may be associated with a microphone used in active noise reduction, a second ring portion 120e may be a ground, and a sleeve portion 130c may be associated with another microphone used in active noise reduction. The plug 160 in FIG. 1c may have a diameter of about 2.5 mm.

It should be understood that other tip, ring, and sleeve configurations are possible for these and other types of plugs. Any approximately cylindrical component that is capable of being inserted into a mobile device and that comprises multiple electrical contact points separated along the long dimension of the component by insulating material will be referred to herein as a plug. A receptacle in a mobile device into which a plug can be inserted and which contains contact points corresponding to the contact points on a plug will be referred to herein as a socket. Also, while the discussion hereinafter may focus on TRRS plugs, it should be understood that the embodiments disclosed herein may be applicable to plugs with other configurations, such as RCA plugs, XLR plugs, TT plugs, USB plugs, or other types of plugs known to those of skill in the art.

In an embodiment, a four-contact plug, such as the TRRS plug 150 of FIG. 1b, is combined with another four-contact plug, such as the TRRS plug 160 of FIG. 1c, into a single, integrated unit. FIGS. 2a, 2b, and 2c illustrate example configurations of such integrated plugs and example sockets into which the integrated plugs may be inserted.

In FIG. 2a, an integrated plug 210 comprises a 3.5 mm TRRS plug 150 coupled to a base portion 220 that extends beyond the diameter of the TRRS plug 150. The surface of the base portion 220 nearest the TRRS plug 150 includes contact points 230 corresponding to the contact points on the 2.5 mm plug 160 illustrated in FIG. 1c. A socket 240 into which the TRRS plug 150 can be inserted includes a circular inner portion 242 configured to accept the TRRS plug 150 and an outer portion 244 that includes surface-mounted contact points 246 corresponding to the contact points 230 on the base portion 220 of the integrated plug 210. The base portion 220 and the socket 240 may include appropriately shaped tabs and slots or similar mechanisms such that the TRRS plug 150 can be inserted into the socket 240 in only one direction, thus ensuring that the contact points 230 on the base portion 220 couple to the proper contact points 246 on the socket 240.

In FIG. 2b, an integrated plug 250 comprises a 3.5 mm TRRS plug 150 and a 2.5 mm plug 160 mounted side-by-side on a common base portion 260. A socket 270 into which the integrated plug 250 can be inserted includes a first circular portion 272 configured to accept the 3.5 mm TRRS plug 150 and a second circular portion 274 configured to accept the 2.5 mm TRRS plug 160. The first circular portion 272 and the second circular portion 274 are configured side-by-side such that the 3.5 mm TRRS plug 150 and the 2.5 mm TRRS plug 160 can be simultaneously inserted into the socket 270.

In FIG. 2c, an integrated plug 280 comprises a 3.5 mm TRRS plug 150 and a 2.5 mm TRRS plug 160 configured in a linear manner, with the lower portion of the 2.5 mm TRRS plug 160 coupled to the upper portion of the 3.5 mm TRRS plug 150 via a layer of insulating material 140. A socket (not shown) for the integrated plug 280 may have a 3.5 mm diameter to accept the 3.5 mm TRRS plug 150 and a depth sufficient to accept the length of the 3.5 mm TRRS plug 150 plus the length of the 2.5 mm TRRS plug 160.

Other configurations that combine two different types of plugs into a single, integrated component are contemplated by this disclosure. For backwards compatibility purposes, it may be preferable for at least one of the plugs to be a traditional 3.5 mm TRRS plug. Hereinafter, any combination of a 3.5 mm TRRS plug and another plug, such as a traditional 2.5 mm TRRS plug, will be referred to as an integrated plug.

When the contact points typically associated with a 3.5 mm TRRS plug and the contact points typically associated with a 2.5 mm TRRS plug are combined in an integrated plug, additional functionality can be achieved that is not possible with either the 3.5 mm TRRS plug contacts or the 2.5 mm TRRS plug contacts alone. For example, since the single microphone contact point on a 3.5 mm TRRS plug and the two microphone contact points on a 2.5 mm TRRS plug combine to provide a total of three microphone contact points, an integrated plug may be used on a headset that can provide active noise cancelation and/or reduction. That is, the input/output cable of a headset may terminate in an integrated plug, and the integrated plug may be inserted into a handset to couple the headset to the handset. Then, as described above, one of the three microphone contact points on the integrated plug may be coupled to a microphone used for picking up the voice of the headset user, and the other two microphone contact points may be coupled to microphones used for picking up background noise in the vicinity of the headset user. Signals from the three microphones may be sent to a handset that has sufficient processing power to generate an inverse signal to the background noise signal, as described above. The handset may then use the inverse signal in performing the active noise cancelation and/or active noise reduction operations described above.

It may be expected that the four contact points traditionally used on TRRS plugs for the left audio channel, the right audio channel, ground, and one microphone may continue to be used for those functions on an integrated plug. Therefore, the four remaining contact points on the integrated plug may be used for other purposes. Hereinafter, any of these four remaining contact points on an integrated plug will be referred to as an additional contact point.

In an embodiment, an additional contact point may be used for initiating a function on a handset into which an integrated plug is inserted. Examples of functions that may be initiated via an additional contact point include taking a photograph using a still camera on the handset, starting a video recording using a video recorder on the handset, starting a sound recording using a sound recorder on the handset, dialing a predefined number on a telephone on the handset, and launching an application on the handset.

In an embodiment, such functions may be initiated by pressing a button on a headset on which a cable terminated by an integrated plug is present. Alternatively, such functions may be initiated by some other type of hardware-based activation that generates a pulsed electrical signal. Hereinafter, any action that may be performed on a hardware component to generate a pulsed electrical signal may be referred to as the press of a button. The electrical signal provided by each button press is a single, momentary pulse of analog electrical energy rather than digitally encoded data. In an embodiment, when a headset cable with an integrated plug is inserted into a handset, pressing a button on the headset may send an electrical signal to an additional contact point on the integrated plug. When the handset receives the signal through the additional contact point, the handset may perform a function that the handset has been programmed to perform when receiving a signal through the additional contact point. In some cases, the button on the headset may be a button that has been installed on the headset for the purpose of initiating a push-to-talk function and may alternatively or additionally be used for that purpose.

In an embodiment, different types or patterns of presses on the button may initiate different functions. For example, a single press of the button for a short time, such as a single tap of the button, may initiate a first function; two short presses of the button in rapid succession, such as a double tap of the button, may initiate a second function; and maintaining the button in a depressed state for an extended length of time may initiate a third function. Herein, button presses may be said to occur in rapid succession if the button presses occur within a defined maximum delay time of one another, such as 200 milliseconds, 500 milliseconds, 900 milliseconds, or any other time value typically associated with the "double click" commonly used in computer mouse operations.

In an embodiment, the function or functions that are initiated when the button is pressed may be programmable by a user of a device configured to accept an integrated plug. That is, when an electrical signal is sent to a contact point on an integrated plug as the result of a press of the button, the function performed by the device is a function that was specified by the device user after the time of manufacture of the device rather than a function that was specified during the device's manufacturing process.

In an embodiment, a device may include an application that, when launched, presents an interface on the device's display screen. The interface may allow the device user to specify one or more functions that will be initiated on the device when a button is tapped or held down while an integrated plug is inserted in the device.

Figure 3:
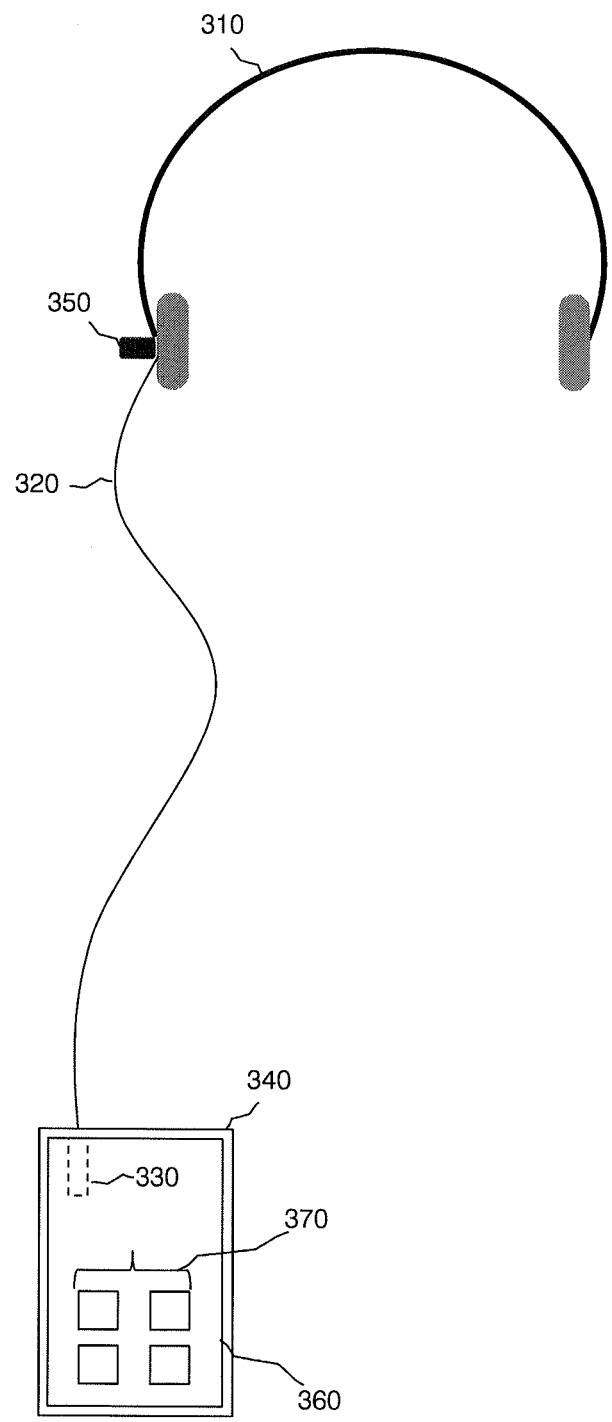
FIG. 3 illustrates a handset and a headset suitable for implementing the several embodiments of the disclosure.

FIG. 3 illustrates a headset 310 that has an input/output cable 320 terminated by an integrated plug 330. It may be assumed that the integrated plug 330 has been inserted into a socket on a handset 340 or a similar mobile device. The integrated plug 330 is thus not visible in the drawing and is represented by dashed lines. The headset 310 includes a button 350 that may be used for initiating a function on the handset 340 via an additional contact point on the integrated plug 330, as described herein. While the button 350 is depicted on one of the earpieces of the headset 310, the button 350 could be in other locations on the headset 310. The handset 340 includes a display screen 360 on which may be displayed a plurality of icons 370 or similar input mechanisms. A user of the handset 340 may select one of the icons 370 to launch an application for selecting a function on the handset 340 that is to be initiated when the button 350 on the headset 310 is depressed.

In another embodiment, a device may be provided with a capability to detect whether a 3.5 mm TRRS plug, a 2.5 mm TRRS plug, or an integrated plug has been inserted into a socket on the device. The device may make different sets of functions available for initiation upon the pressing of a button depending on which type of plug has been inserted. For example, if only a 3.5 mm TRRS plug has been inserted, only functions typically associated with 3.5 mm TRRS plugs may be available for initiation. If only a 2.5 mm TRRS plug has been inserted, only functions typically associated with 2.5 mm TRRS plugs may be available for initiation. If an integrated plug has been inserted, additional functions such as those described above may be made available for initiation.

In another embodiment, a headset may retain identity information related to the headset, and the identification information may be provided to a handset via an additional contact point when an integrated plug is inserted into the handset. The identity information received via the additional contact point may be used by the handset to customize the functions available for initiation on the handset upon the pressing of a button on the headset. That is, the handset may have a set of functions available for initiation, and different subsets within the set may be appropriate for different types of headsets. Using the identity information, the handset may determine the type of headset that has been coupled to the handset and may make available for initiation the subset of functions appropriate for that type of headset.

In a variation of this embodiment, a cable terminated at one end by an integrated plug may be terminated at the other end by a component other than a headset. Identity information about this other component may be provided to a device via an additional contact point when the integrated plug is inserted into the device. The device may make different sets of functions available for initiation on the device depending on the type of component that has been coupled to the device, as specified by the identity information.

Figure 4:
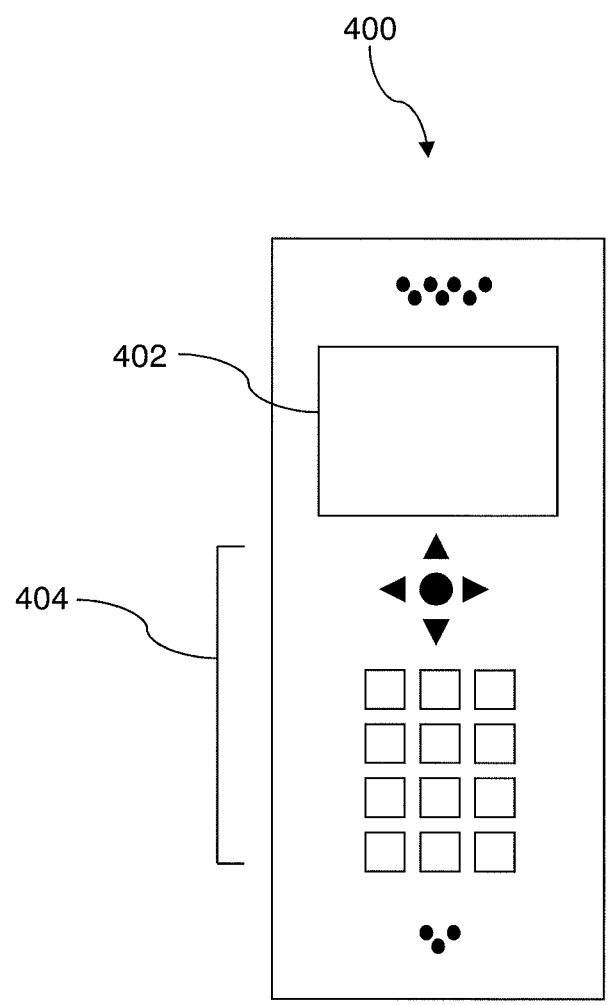
FIG. 4 depicts a mobile device system suitable for implementing the several embodiments of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
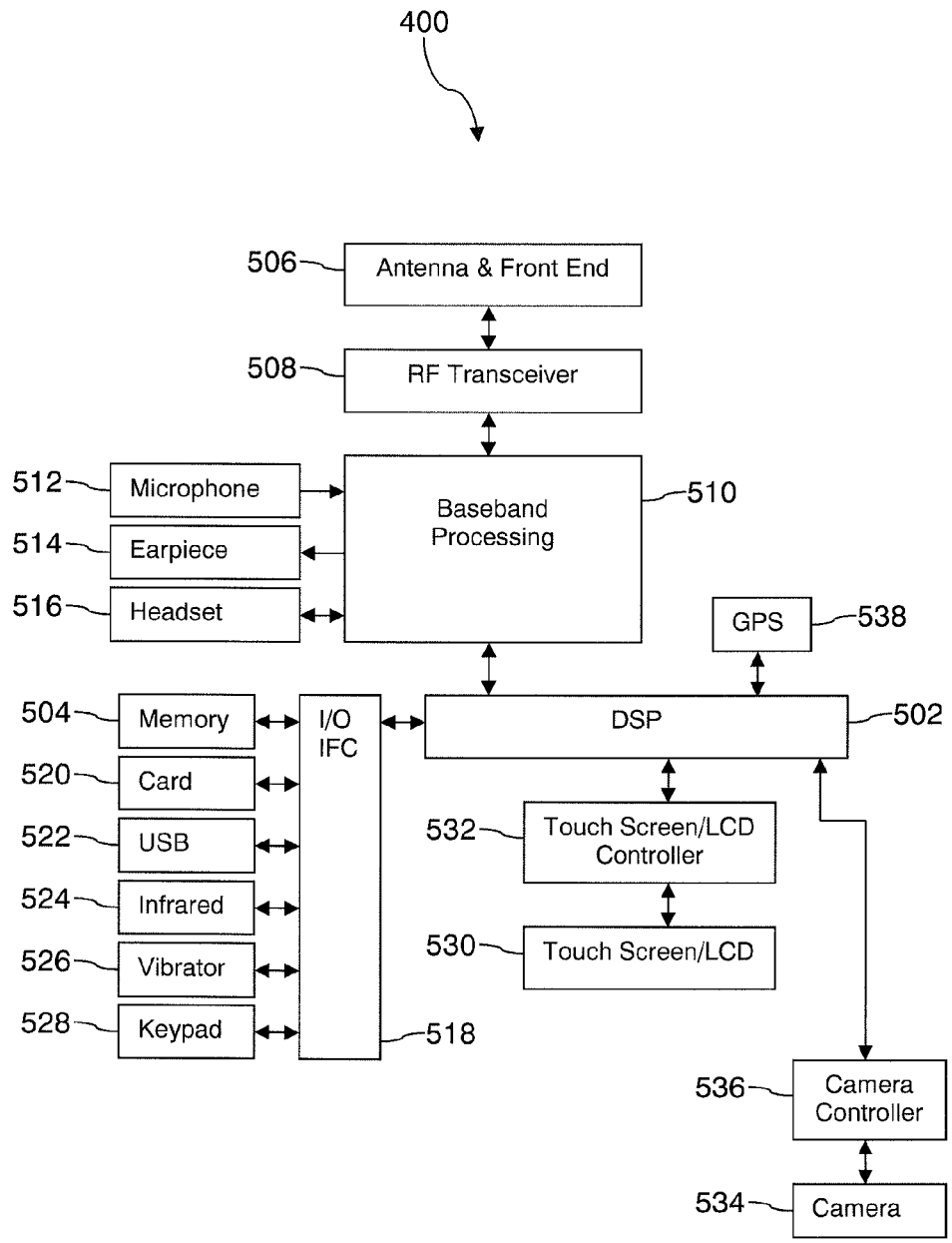
FIG. 5 is a block diagram of a mobile device system suitable for implementing the several embodiments of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
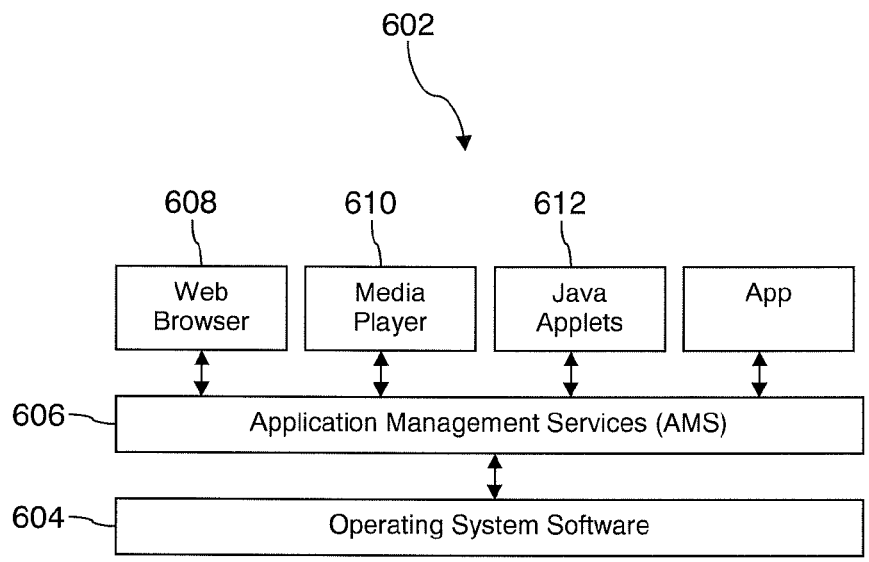
FIG. 6a illustrates a software environment suitable for implementing the several embodiments of the disclosure.

FIG. 6a illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6a are a web browser application 608, a media player application 610, and Java applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The Java applets 612 may be executed by the mobile device 400 to provide a variety of functionality including games, utilities, and other functionality.

Figure 6B:
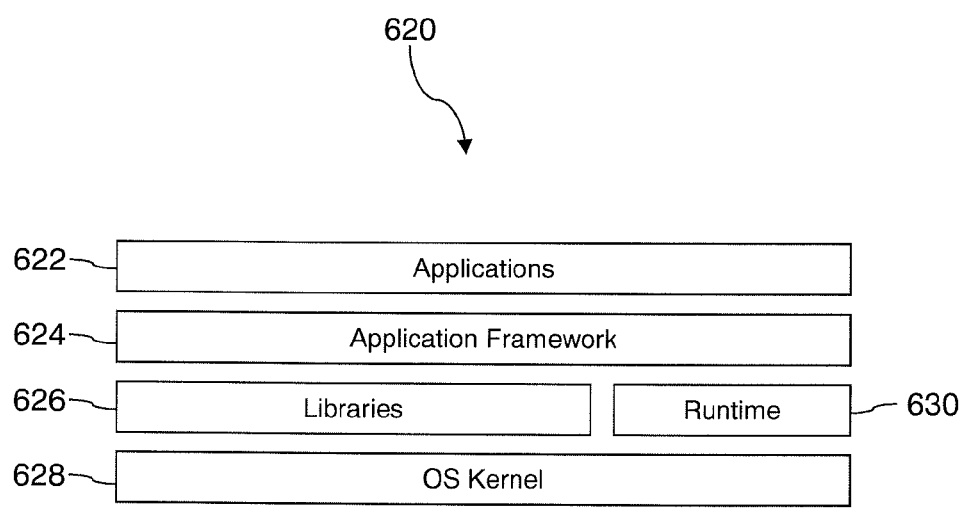
FIG. 6b illustrates an alternative software environment suitable for implementing the several embodiments of the disclosure.

FIG. 6b illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
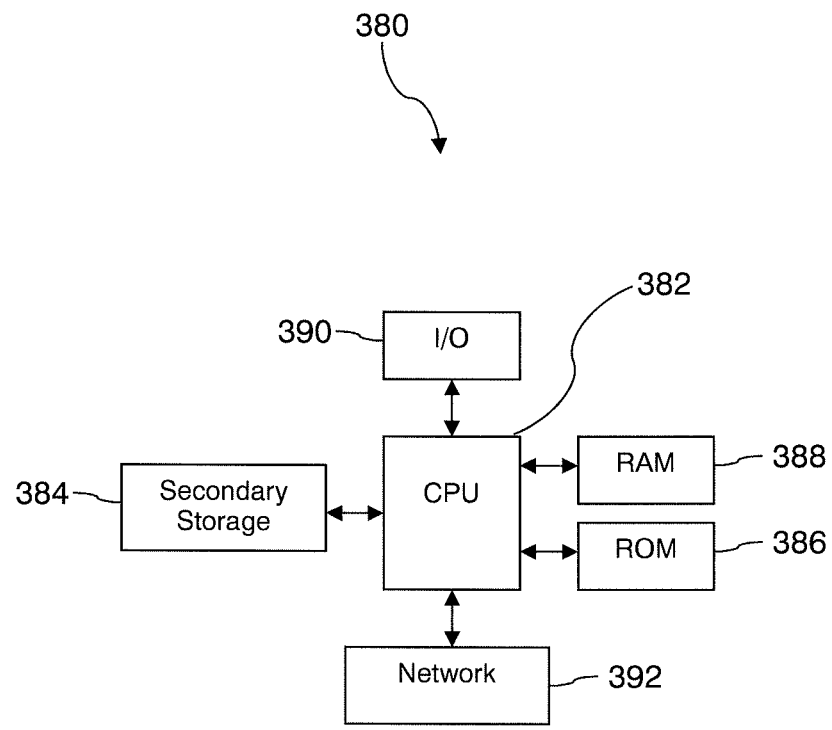
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A telecommunications device capable of performing a plurality of functions in addition to telecommunications functions, the device comprising:
   a socket;
   a non-transitory memory;
   a processor communicatively coupled to the non-transitory memory and in signal communication with the socket; and
   instructions stored in the non-transitory memory and executable to configure the processor such that the device performs a function specified by the instructions to be performed when a signal is received via a contact point from an integrated plug that is inserted into the socket on the device, wherein the integrated plug comprises a combination of a first set of contact points on a 3.5 millimeter (mm) tip/ring/ring/sleeve (TRRS) plug and a second set of contact points on a 2.5 mm TRRS plug, wherein the first set and the second set collectively comprise at least three microphone contacts that are electrically isolate from each other, wherein the function corresponds to an action taken on a hardware component on the device, and wherein specification of the function to be performed occurs after a manufacturing process for the device is complete.

2. The device of claim 1, wherein the 2.5 mm TRRS plug has a plurality of contact points, wherein the plurality of contact points on the 2.5 mm TRRS plug are configured for use in a noise control feature by the device, wherein the noise control feature includes one of active noise cancelation operations, active noise reduction operations, or a combination thereof.

3. The device of claim 1, wherein the device determines that only a 2.5 mm TRRS plug, only a 3.5 mm TRRS plug, or the integrated plug has been inserted into the socket of the device and makes available for initiation a set of functions, wherein the set of functions is one of a first set of functions when only a 2.5 mm TRRS plug has been detected, a second set of functions when only a 3.5 mm TRRS plug has been detected, or a third set of functions when the integrated plug has been detected.

4. The device of claim 1, wherein the signal is generated by a press of a button on a headset in signal communication with the device via the integrated plug.

5. The device of claim 4, wherein the button is configured to initiate at least a push-to-talk feature on the device.

6. The device of claim 4, wherein a single, momentary press of the button initiates a first function on the device, two momentary presses of the button in rapid succession initiate a second function on the device, and a continuous press of the button initiates a third function on the device.

7. The device of claim 1, wherein the device receives identity information for a component via the socket in signal communication with a contact point, and the device makes available for initiation a subset of all functions provided by the device, the subset being determined based on the identity information.

8. The device of claim 1, further comprising an application that, when launched, allows a specification to be made of a function that is to be performed when the signal is received via the socket.

9. A method for initiating a function on a telecommunications device, the method comprising:
- receiving, by the telecommunications device, an electrical signal via a contact point on a plug inserted into a socket on the telecommunications device;
- determining, by the telecommunications device, that the plug is one of a 3.5 millimeter (mm) tip/ring/ring/sleeve (TRRS) plug, a 2.5 mm TRRS plug, or a combination thereof; and
- based on the determining, performing, by the telecommunications device, a function specified to be performed when the electrical signal is received via the contact point, wherein the specification of the function to be performed occurs after a manufacturing process for the device is complete.

10. The method of claim 9, wherein the electrical signal is generated by a press of a button on a headset in signal communication with the device.

11. The method of claim 10, wherein the button is configured to initiate at least a push-to-talk feature on the device.

12. The method of claim 10, wherein a single, momentary press of the button initiates a first function on the device, two momentary presses of the button in rapid succession initiate a second function on the device, and a continuous press of the button initiates a third function on the device.

13. The method of claim 9, wherein the determining includes a determination of identity information for a component via the contact point based on receiving the electrical signal, and further comprising making available, by the telecommunications device, initiation a subset of all functions provided by the telecommunications device, the subset being determined based on the identity information.

14. The method of claim 9, wherein the device includes an application that, when launched, allows a specification to be made of a function that is to be performed when the electrical signal is received via the contact point.

15. A telecommunications device capable of performing a plurality of functions in addition to telecommunications functions, the telecommunications device comprising:
- a socket configured to communicatively couple with an integrated plug, wherein the integrated plug includes a combination of a first set of contact points on a 3.5 millimeter (mm) tip/ring/ring/sleeve (TRRS) plug and a second set of contact points on a 2.5 mm TRRS plug;
- a non-transitory memory;
- a processor communicatively coupled to at least the non-transitory memory and in signal communication with the socket; and
- instructions stored in the non-transitory memory and executable to configure the processor such that, when the device receives identity information for a component via a contact point on the socket in signal communication with a plug inserted into the socket of the device, the device makes available for initiation a subset of all functions provided by the device, the subset being determined based on the identity information and the plug.

16. The device of claim 15, wherein the first set and the second set of contact points collectively comprise a plurality of contact points on the integrated plug that are configured for use in a noise control feature by the device, wherein the noise control feature includes one of active noise cancelation operations, active noise reduction operations, or a combination thereof.

17. The device of claim 15, wherein the device further:
- determines a type for the plug inserted into the socket, the type being one of only a 2.5 mm TRRS plug, only a 3.5 mm TRRS plug, or the integrated plug, and
- makes available for initiation a set of functions based on determination of the type of plug, the set of functions being one of a first set of functions when only the 2.5 mm TRRS plug has been detected, a second set of functions when only the 3.5 mm TRRS plug has been detected, or a third set of functions when the integrated plug has been detected.

18. The device of claim 15, further comprising an application that, when launched, allows a specification to be made of a function that is to be performed when a signal is received via the contact point.

19. The device of claim 15, wherein the socket comprises at least eight contact points that are electrically isolate from each other, wherein the contact point is one of the at least eight contact points, and wherein the socket has four contact points that communicatively coupled with one of a 3.5 mm TRRS plug or a 2.5 mm TRRS plug.

20. The method of claim 9,
- wherein the determining determines that the plug is a combination of both the 3.5 mm TRRS plug and the 2.5 mm TRRS plug, and
- wherein responsive to determining the plug is the combination, performing the function includes initiating a noise cancelation operation by the telecommunications device, wherein the noise cancelation operation includes one of active noise cancelation operations, active noise reduction operations, or a combination thereof.

* * * * *